(12) United States Patent
Irvine et al.

(10) Patent No.: US 12,118,001 B2
(45) Date of Patent: Oct. 15, 2024

(54) COMPUTER-BASED PLATFORMS AND SYSTEMS CONFIGURED FOR EVENT PROCESSING WITH A SPECIALIZED DOMAIN-SPECIFIC PROGRAMMING LANGUAGE AND METHODS OF USE THEREOF

(71) Applicant: Capital One Services, LLC, McLean, VA (US)

(72) Inventors: Leandra Irvine, San Jose, CA (US); Girish Kolanthra Ramadevan, Tracy, CA (US); Leonhardt deWaal, Orinda, CA (US); Duncan Braun McIsaac, San Francisco, CA (US)

(73) Assignee: Capital One Services, LLC, McLean, VA (US)

( * ) Notice: Subject to any disclaimer, the term of this patent is extended or adjusted under 35 U.S.C. 154(b) by 218 days.

(21) Appl. No.: 17/714,808

(22) Filed: Apr. 6, 2022

(65) Prior Publication Data
US 2023/0325387 A1   Oct. 12, 2023

(51) Int. Cl.
*G06F 16/2455* (2019.01)
*G06F 16/23* (2019.01)
(Continued)

(52) U.S. Cl.
CPC .... *G06F 16/24553* (2019.01); *G06F 16/2379* (2019.01); *G06F 16/2457* (2019.01); *G06F 16/252* (2019.01); *G06Q 40/02* (2013.01)

(58) Field of Classification Search
CPC .......... G06F 16/24553; G06F 16/2379; G06F 16/2457; G06F 16/252; G06F 8/35; G06F 9/466; G06F 9/542; G06Q 40/02
See application file for complete search history.

(56) References Cited

U.S. PATENT DOCUMENTS 7,801,782 B2   9/2010   Deaddio et al.
9,081,850 B2   7/2015   Fischer
(Continued)

FOREIGN PATENT DOCUMENTS

WO   2020092446 A2   5/2020

OTHER PUBLICATIONS

International Search Report and Written Opinion from International Appln. No. PCT/US23/65440 dated Jul. 11, 2023.

*Primary Examiner* — Irete F Ehichioya
*Assistant Examiner* — Xiaoqin Hu
(74) *Attorney, Agent, or Firm* — Greenberg Traurig, LLP

(57) ABSTRACT

The present application includes systems and methods to receive an event including key-value pairs representing data attributes defining an operation. An instrument configuration is accessed having an object configuration associated with a data object and a rule configuration, where the rule configuration defines at least one action to perform on the data object as a result of an object state of the data object. A change to the object state is determined based on the operation of the event. An inverse dependency graph is generated to map reactive actions in response to the change based on the object configuration. A reactive action to an additional data object is determined based on the inverse dependency graph, and an update to the change as a result of the reactive action is determined. A data record of states is updated with the update to the change and the reactive action.

20 Claims, 9 Drawing Sheets

(51) Int. Cl.
  *G06F 16/2457* (2019.01)
  *G06F 16/25* (2019.01)
  *G06Q 40/02* (2023.01)

(56) References Cited

U.S. PATENT DOCUMENTS

| | | |
|---|---|---|
| 10,373,066 B2 | 8/2019 | Hettenkofer et al. |
| 11,714,796 B1* | 8/2023 | Srivastava .............. G06F 40/18 |
| | | 707/769 |
| 2013/0030971 A1* | 1/2013 | Weiss ..................... G06Q 40/02 |
| | | 705/35 |
| 2019/0251078 A1 | 8/2019 | Yan |
| 2020/0250633 A1* | 8/2020 | Vinson ................ G06Q 20/4015 |
| 2021/0312081 A1* | 10/2021 | Leekley ............. H04N 21/4755 |
| 2022/0188819 A1* | 6/2022 | Ognjanovic .......... H04L 9/3236 |

* cited by examiner

COMPUTER-BASED PLATFORMS AND SYSTEMS CONFIGURED FOR EVENT PROCESSING WITH A SPECIALIZED DOMAIN-SPECIFIC PROGRAMMING LANGUAGE AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based platforms and systems configured for event processing with a specialized domain-specific programming language and methods of use thereof.

BACKGROUND OF TECHNOLOGY

Typically, event processing requires the tracking and processing of events using discrete and predefined services or applications. Accordingly, each event must be associated with a particular service and/or application from a set of predefined services and/or applications. Such an arrangement provides little ability to customize the processing rules to different scenarios.

SUMMARY OF DESCRIBED SUBJECT MATTER

In some embodiments, the present disclosure provides an exemplary technically improved computer-based method that includes at least the following components/steps of: receiving, by at least one processor, an event including a reference to an instrument; where the event includes at least one key-value pair representing at least one data attribute defining an operation; accessing, by the at least one processor, an instrument configuration associated with the instrument; where the instrument configuration includes at least one object configuration associated with at least one data object and at least one rule configuration; where the at least one object configuration includes: at least one object type associated with the instrument, and at least one object kind associated with the instrument; where the at least one rule configuration defines at least one action to perform on the at least one data object as a result of at least one object state of the at least one data object based at least in part on the at least one object type and the at least one object kind; determining, by the at least one processor, at least one change to at least one object state based at least in part on the at least one data attribute; generating, by the at least one processor, an inverse dependency graph to map reactive actions in response to the at least one change to at least one object state based at least in part on the at least one object configuration; determining, by the at least one processor, at least one reactive action of the reactive actions based at least in part on the inverse dependency graph; determining, by the at least one processor, an update to the at least one change to the at least one object state as a result of the at least one reactive action; and updating, by the at least one processor, a data record of states including changes to the at least one data object based at least in part on the update to the at least one change to the at least one object state.

In some embodiments, the present disclosure provides an exemplary technically improved computer-based system that includes at least the following components of at least one processor configured to execute software instructions. The software instructions cause the at least one processor to perform steps to: receive an event including a reference to an instrument; where the event includes at least one key-value pair representing at least one data attribute defining an operation; access an instrument configuration associated with the instrument; where the instrument configuration includes at least one object configuration associated with at least one data object and at least one rule configuration; where the at least one object configuration includes: at least one object type associated with the instrument, and at least one object kind associated with the instrument; where the at least one rule configuration defines at least one action to perform on the at least one data object as a result of at least one object state of the at least one data object based at least in part on the at least one object type and the at least one object kind; determine at least one change to at least one object state based at least in part on the at least one data attribute; generate an inverse dependency graph to map reactive actions in response to the at least one change to at least one object state based at least in part on the at least one object configuration; determine at least one reactive action of the reactive actions based at least in part on the inverse dependency graph; determine an update to the at least one change to the at least one object state as a result of the at least one reactive action; and update a data record of states including changes to the at least one data object based at least in part on the update to the at least one change to the at least one object state.

In some embodiments, the exemplary technically improved computer-based systems and methods of the present disclosure may further include generating, by the at least one processor, a dependency graph based at least in part on the at least one object configuration, where the dependency graph maps a source object and a target object for each action of the at least one object type associated with each object of a plurality of objects.

In some embodiments, the exemplary technically improved computer-based systems and methods of the present disclosure may further include generating, by the at least one processor, the inverse dependency graph by inverting the dependency graph.

In some embodiments, the exemplary technically improved computer-based systems and methods of the present disclosure may further include where the at least one rule configuration includes at least one simple configuration and at least one object configuration.

In some embodiments, the exemplary technically improved computer-based systems and methods of the present disclosure may further include where the instrument includes a financial product; where the event includes at least one transaction request; and where the instrument configuration includes a digitization of the financial product to enable automatic processing of the at least one transaction request relative to an account associated with the financial product.

In some embodiments, the exemplary technically improved computer-based systems and methods of the present disclosure may further include determining, by the at least one processor, a date and a time associated with the event; and recording, by the at least one processor, the changes to the at least one data object by appending the changes with the date and the time to at least one set of changes associated with the at least one data object to update the at least one change to the at least one object state.

In some embodiments, the exemplary technically improved computer-based systems and methods of the present disclosure may further include where the at least one object state includes at least one value representing a total amount of actions and reactive actions associated with each data object of the at least one data object.

In some embodiments, the exemplary technically improved computer-based systems and methods of the present disclosure may further include where the at least one data object is a plurality of data objects; and where the at least one object configuration includes at least one rollup configuration specifying a combination of a subset of the plurality of data objects.

In some embodiments, the exemplary technically improved computer-based systems and methods of the present disclosure may further include where the at least one data object is a plurality of data objects; and further including determining, by the at least one processor, at least one allocation action to move a value from a source data object to a plurality of target data objects based at least in part on at least one allocation configuration of the at least one object configuration and the at least one action.

In some embodiments, the exemplary technically improved computer-based systems and methods of the present disclosure may further include generating, by the at least one processor, a change to each target data object of the plurality of target data objects by sequentially allocating the value from the source data object to each target data object until an allocation limit is reached according to an order of the plurality of target data objects in the at least one allocation configuration.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 9 illustrate systems and methods of event processing and event tracking to track system and/or platform state in a flexible and efficient manner. The following embodiments provide technical solutions and technical improvements that overcome technical problems, drawbacks and/or deficiencies in the technical fields involving data event and platform/system state tracking and processing. As explained in more detail, below, technical solutions and technical improvements herein include aspects of improved state ledgers and specialized domain-specific language(s) (DSL) for accurately and efficiently tracking changes in state due to data events in a customizable and flexible manner. Based on such technical features, further technical benefits become available to users and operators of these systems and methods. Moreover, various practical applications of the disclosed technology are also described, which provide further practical benefits to users and operators that are also new and useful improvements in the art.

Figure 1:
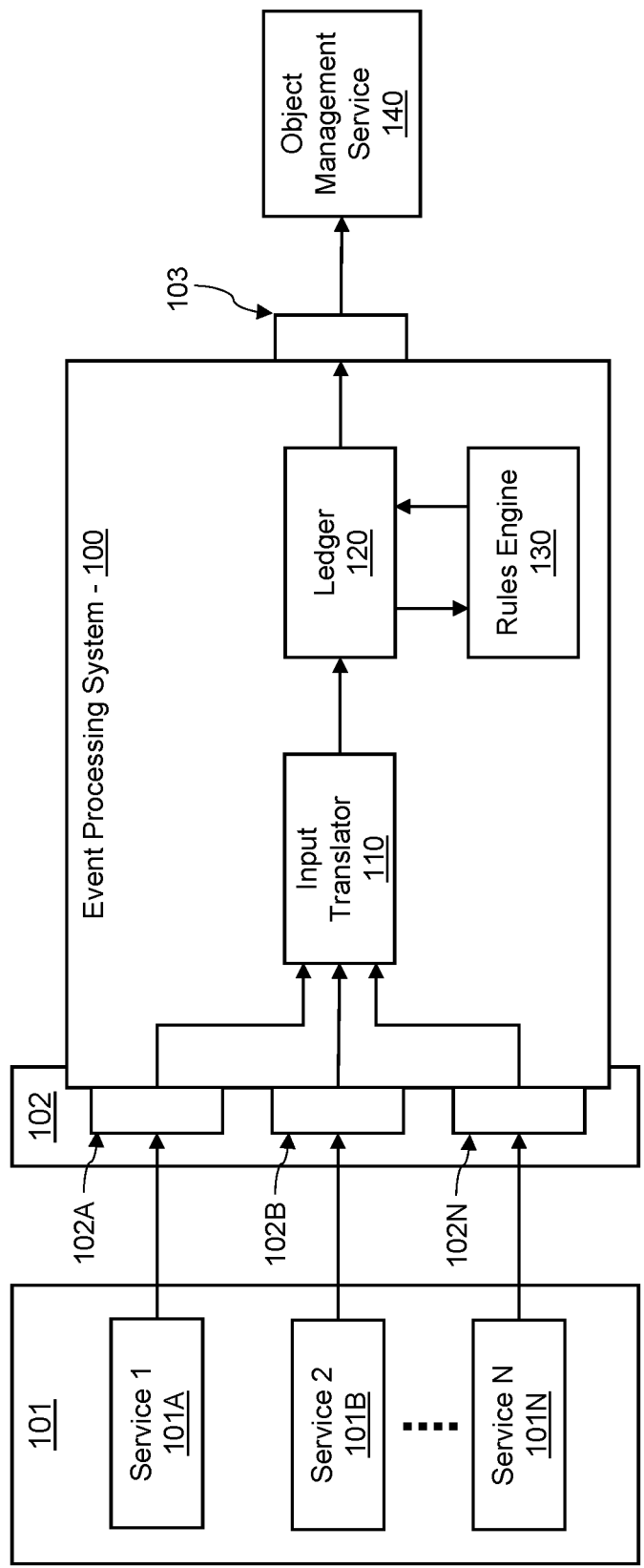
FIGS. 1-9 show one or more schematic flow diagrams, certain computer-based architectures, and/or screenshots of various specialized graphical user interfaces which are illustrative of some exemplary aspects of at least some embodiments of the present disclosure.

FIG. 1 depicts a block diagram of an exemplary computer-based system and platform for event processing in accordance with one or more embodiments of the present disclosure.

In some embodiments, an event processing system 100 may be employed to record and update states of various data objects such as, e.g., database objects, physical objected-related records, documents, source code, user profiles and/or accounts for online services and/or financial services, among other data objects. In some embodiments, the event processing system 100 may receive events and, using a domain-specific language (DSL), implement configured rules based on the events to determine the effects of the events on one or more states of the data objects.

In some embodiments, a domain-specific language (DSL) refers to a computer language specialized to a particular application domain. This is in contrast to a general-purpose language (GPL), which is broadly applicable across domains. There are a wide variety of DSLs, ranging from widely used languages for common domains, such as HTML for web pages, down to languages used by only one or a few pieces of software. In some embodiments, the DSL of the event processing system 100 may implement a DSL specialized to event processing, and in some embodiments, of processing events of a particular type. In some embodiments, the DSL is specialized to event processing and can be used to configure rules for processing events of any type to track, e.g., document states, account states, source code states, etc.

In some embodiments, the events may be communicated to the event processing system 100 by one or more services 101. In some embodiments, the service(s) 101 may include service 1, 101A, service 2, 101B through service N, 101N. Each service 101A, 101B, or 101N, may include local or remote computing devices and/or systems, such as, e.g., a processor, memory, storage device, server, cloud system, among other hardware for instantiating service 1 through N, 101A-101N. In some embodiments, each service 101A, 101B, or 101N, may include at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, the service(s) 101 may be instantiated and implemented by one or more servers. In some embodiments, the term "server" may refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, the service(s) 101 may receive an input, such as a user input, electronic request, or other electronic activity. Based on a processing and/or task performed by each service(s) 101, each service(s) 101 may output an event. In some embodiments, an event may include, e.g., a user identifier, a third-party entity identifier, a task or process identifier and/or task or process type, an activity type identifier, an activity value or activity quantity, a time data item, a location data item, a date data item, a device type or device identifier associated with the electronic activity execution device that produced the associated input, an activity description, or other attributes representing characteristics of each data entry.

For example, in some embodiments, the event may include a transaction-related activity, such as a transaction record (e.g., transaction authorization request, posted transaction, etc.). In such an example, the data items may include, e.g., a transaction value, a transaction type, an account identifier or a user identifier or both, a merchant identifier, a transaction authorization date, a transaction post date, a transaction location, an execution device (e.g., point-of-sale device, Internet payment, etc.) among other transaction data and combinations thereof.

In some embodiments, the service(s) 101 may communicate events to the event processing system 100 via a suitable communication technique. The service(s) 101 may communicate with the event processing system 100 in via a network over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below.

In some embodiments, the events output by the service(s) 101 may be communicated using one or more application programming interfaces (API) or other suitable interface. In some embodiments, an "API" refers to a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, each API request may be configured to interface with an adapter 102. In some embodiments, each service 101 may target a particular adapter 102A, adapter 102B through 102N. For example, each adapter 102A through 102N may be configured for a particular API, and each service 101A through 101N may target a particular API when communicating events. In some embodiments, one or more of services 101 may target multiple adapters 102A through 102N or multiple services 101 may target a particular adapter 102, or both.

In some embodiments, the events may be passed from the adapter(s) 102 to an input translator 110. In some embodiments, each service 1 through N 101A-101N may produce events with different data attributes, data attributes formatted in a different way, or any combination thereof. Furthermore, the event processing system 100 may be configured to process data via the DSL using a particular representation. Accordingly, the input translator 110 may receive each event, identify the data attributes represented in the event, and produce a translated event in the representation for use with the DSL.

In some embodiments, the input translator 110 may include any suitable combination of hardware elements and software elements. In some embodiments, the input translator 110 shares hardware elements of the event processing system 100, such as, e.g., a processor, memory, storage device/system, database, etc.

In some embodiments, the input translator 110 may translate the events from the adapter(s) 102 using a suitable parsing algorithm and/or model, such as, e.g., natural language processing, one or more machine learning models trained to translate events into the particular representation, or other suitable translation technique. In some embodiments, the events include structured data. Accordingly, the input translator 110 may implement a map (e.g., a table, array, index, library, or other suitable map) to map the data attributes of each event to the particular representation used by the DSL. In some embodiments, the particular representation may include any suitable structured data, including, e.g., comma separated values (CSV), data tables, data objects, data forms, key-value pairs, among others or any combination thereof.

In some embodiments, the translated events may be provided to a ledger 120 to record a state or state change resulting from each event based on the data attributes thereof. In some embodiments, each event may be added to the ledger 120 as a new state. For example, new financial transactions may be recorded for transaction account, new changes to source code or electronic documents may be recorded to maintain a record of content changes, among other event tracking embodiments.

Accordingly, in some embodiments, the ledger 120 may include, e.g., a sequential index of states organized by, e.g., time, index number (e.g., count), or by any other suitable sequencing notation. For example, where the particular translation for translated events includes key-value pairs, the ledger 120 may include a table or list of sets of key-value pairs representing each state resulting from each event.

In some embodiments, the ledger 120 may alternatively or additionally be configured interact and/or to store data in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, an event may result in a state or change in state based on rules triggered by the event. In some embodiments, a rules engine 130 may be connected to the ledger 120 and monitor the entry of new events. Based on the data attributes of a new event, the rules engine 130 may identify a configuration applicable to the new event and process the new event with the configuration.

In some embodiments, the configuration may specify actions triggered by the new event in relation to data objects. For example, the new event may be detected by the rules engine 130. The new event may specify one or more data object(s) with which the new event is associated with one or more action(s) performed on the data object(s) as a result of the new event. The action(s) may be to add, subtract, append, remove or perform some other data manipulation relative to the particular data object based on the data attributes of the new event.

In some embodiments, the action(s) and/or data object(s) of the new event may affect other data objects. The rules engine 130 determines the configuration that defines what the other data objects are and the actions to perform relative to the other data objects. Each action results in a change in state of a data object. As a result, based on the configuration identified by the rules engine 130, the states of each data object may be updated according to the data attributes of the new event. Each new event may be appended to the ledger 120 in a sequence, specifying the states or changes in states of each data object and the data attributes of the new event. As a result, the ledger 120 may record a chain of states resulting from received events to reflect the states of each data object as specified by the rules of configuration associated with each event.

As a result, states of data objects may be quickly and efficiently tracked using event processing with the rules engine 130. The rules engine 130 implements fully customizable rules configured according to data attributes and resulting actions relative to data objects. By configuring each action and data object greater flexibility is achieved that is not restricted to predefined software programs and/or services.

In some embodiments, data attributes of an event may include, e.g., a source identifier, a destination identifier, an activity or action identifier, a date data item, a time data item, among other data attributes characterizing the event or any combination thereof. In some embodiments, the rules engine 130 may use the data attributes to identify the associated configuration, e.g., based on an account, document, project, code base, etc. specified by the source and/or destination and/or action identifiers of the data attributes.

In some embodiments, the ledger 120 may also record the configuration used to process each event of each state. In some embodiments, each configuration may be associated with a particular source identifier, destination identifier, activity or action identifier, or any combination thereof. Thus, the configuration used to process each event may be identifiable according to the source identifier, destination identifier, activity or action identifier, or by an additional configuration identifier. In some embodiments, configurations may be modified or replaced over time. Thus, the date data item of the data attributes of each event may also be used to identify the configuration used to process each event.

In some embodiments, the ledger 120 may record the state and/or change in state of each data object while an object management service 140 may manage the data object itself. For example, the ledger 120 may record changes to a code base while the object management service 140 may store copies of the source code of the code base. Similarly, the ledger 120 may record changes in financial balances while the object management service 140 may manage user accessible account data (e.g., balances, transaction histories, overdraft status, account alerts, etc.).

Accordingly, in some embodiments, the ledger 120 may output the states of data objects to an adapter 103 of the event processing system 100. In some embodiments, as described above, the adapter 103 may be any suitable communications interface to enable data communication between the event processing system 100 and the object management service 140 (e.g., hardware and/or software interfaces). Thus, in some embodiments, the adapter 103 may communicate the states of the data objects to the object management service 140 to update the data objects themselves. As a result, a user may access the data objects via the object management service 140.

Figure 2:
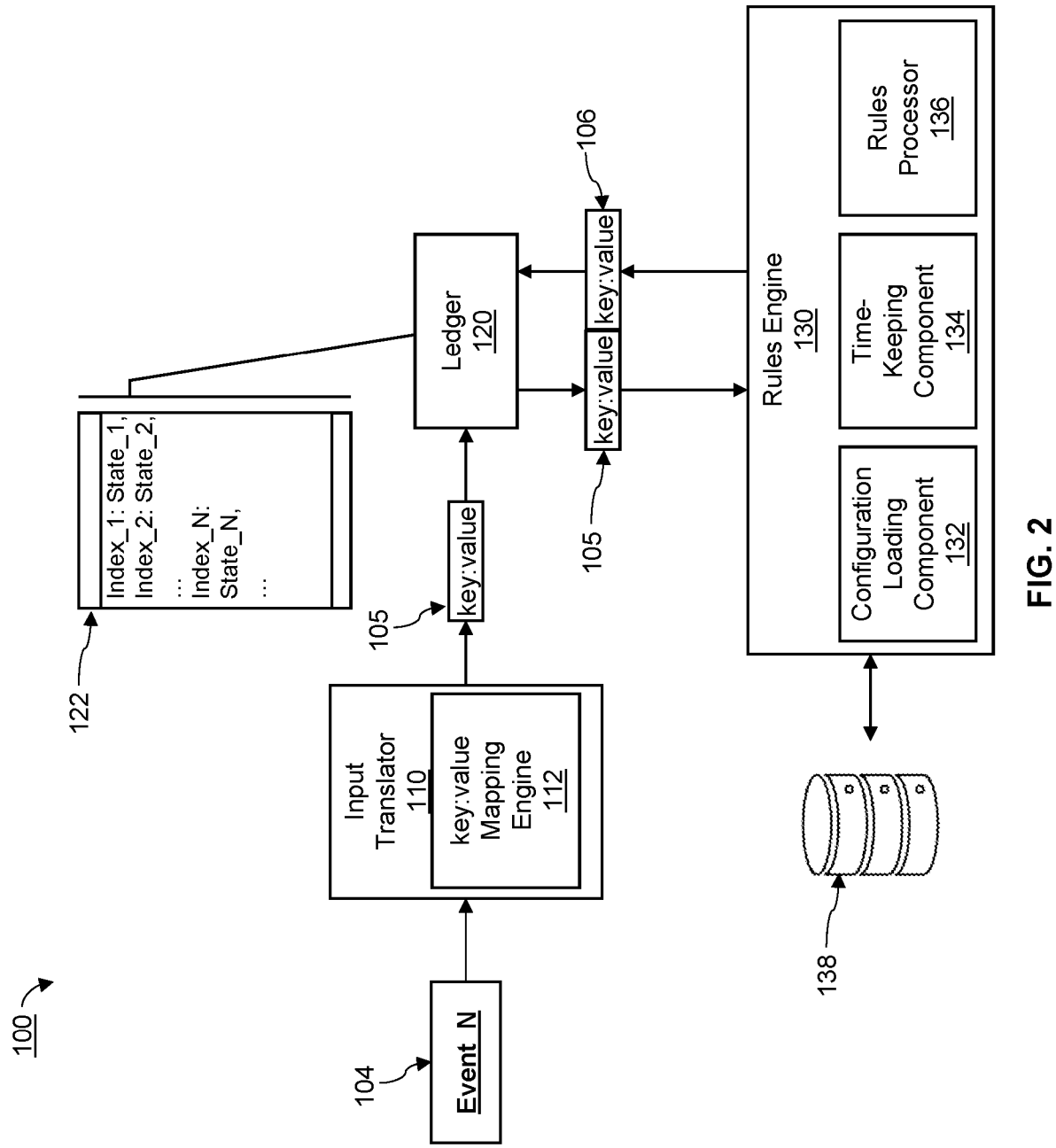

FIG. 2 depicts another block diagram of another exemplary computer-based system and platform for event processing in accordance with one or more embodiments of the present disclosure.

In some embodiments, the DSL of the rules engine 130 is designed to handle key-value pairs. Accordingly, the ledger 120 may record event data attributes and data object states as key-value pairs. Using key-value pairs facilitates efficient processing and compact data recordation for improved resource efficiency. Moreover, the key-value pairs provide a foundation for data object-based rules and actions configured to update states based on attributes of an event_N 104 that defines an operation relative to the data object.

In some embodiments, event_N 104 is provided (e.g., from adapter(s) 102) to the input translator 110 to translate into a key:value entry 105. In some embodiments, the event_N 104 includes data attributes that characterize the event output by a service(s) 101. Such data attributes may include, e.g., a source identifier, a destination identifier, an activity or action identifier, a date data item, a time data item, among other data attributes characterizing the event or any combination thereof.

In some embodiments, the input translator 110 may include a key:value mapping engine 112. Each service 101 may have a known format for representing data attributes for an event_N 104. Accordingly, the key:value mapping engine 112 may identify the service 101 that originated the event_N 104 and determine the format that the service 101 uses. Based on the format, the key:value mapping engine 112 may access a mapping, such as, e.g., a table, index, or other mapping. The mapping may correlate each data attribute of the format of the event_N 104 to a key:value pair.

For example, the event_N 104 may represent data attributes as CSV having a particular order. The mapping for the event_N 104 may map the order (e.g., the index number of each value in the CSV) to a particular key and enter the value from each CSV value as the value for the particular key.

Accordingly, the key:value mapping engine 112 may produce the key:value entry 105 to represent the event_N 104 by mapping each data attribute to a key-value pair. Each key-value pair may, therefore, signify a particular data attribute of the event_N 104. As a result, the key:value entry 105 may have multiple key-value pairs to represent each data attribute characterizing the event_N 104.

In some embodiments, the key:value entry 105 may effect a state of one or more data objects. The ledger 120 may record the events and data object states. Accordingly, the ledger 120 may receive the key:value entry 105 representing the data attributes of the event_N 104 and defining the operation on the data objects. The ledger 120 may create an entry in an index 122 that records changes in states of the data objects. However, to determine changes to states of data objects, the rules engine 130 may detect the key:value entry 105 and the keys represented therein.

In some embodiments, the rules engine 130 may utilize rule configurations that define actions to perform with respect to each data object based in the key:value entry 105, and thereby update the states of each data object. In some embodiments, the rules engine 130 may detect a key for the rules configuration associated with the key:value entry 105. In some embodiments, the key may signify any suitable data attribute for associating a rules configuration. For example, the user and/or third-party user may have a rules configuration specifically configured for the user and/or third-party user. Thus, in some embodiments, the rules engine 130 may use a configuration loading component 132 to identify the key signifying the user and/or third-party user identifiers. As another example, rules may be configured according to activity type. Thus, the rules engine 130 may identify the key signifying the activity or action identifier or a type thereof.

In some embodiments, upon identifying the key that signifies the data attribute that determines the rules configuration, the configuration loading component 132 may access the value for that key and identify the rules configuration associated with the value. In some embodiments, the configuration loading component 132 may access a data storage 138 that stores the rules configurations and load the rules configuration for the value of the key associated with configuration identification.

In some embodiments, the data storage 138 may include, e.g., a suitable memory or storage solutions for maintaining electronic data representing the activity histories for each account. For example, the data storage solution may include database technology such as, e.g., a centralized or distributed database, cloud storage platform, decentralized system, server or server system, among other storage systems. In some embodiments, the data storage 138 may, additionally or alternatively, include one or more data storage devices such as, e.g., a hard drive, solid-state drive, flash drive, or other suitable storage device. In some embodiments, the data storage 138 may, additionally or alternatively, include one or more temporary storage devices such as, e.g., a random-access memory, cache, buffer, or other suitable memory device, or any other data storage solution and combinations thereof.

In some embodiments, based on the type of data storage 138 used, the configuration loading component 132 may load the rules configuration using a suitable data access technique. For example, where the data storage 138 is a relationship database, the configuration loading component 132 may retrieve the rules configuration by querying the value associated with the rules configuration using a suitable query language (e.g., JSONiq, LDAP, Object Query Language (OQL), Object Constraint Language (OCL), PTXL, QUEL, SPARQL, SQL, XQuery, Cypher, DMX, FQL, Contextual Query Language (CQL), AQL, among suitable database query languages). However, where other data storage technologies are used, the configuration loading component 132 may employ different data search and access techniques (e.g., heuristic search, indexing, etc.).

In some embodiments, the rules configuration may include a configurations for data objects (object configurations) as well as configurations for actions made to objects (action configurations). In some embodiments, the rules configurations may define actions for each object based on the type and kind of the data objects. For example, whether to perform addition and/or subtraction actions to a data object may depend on the type and kind of the data object (object type and object kind, respectively) and the data attributes of the key:value entry 105.

Accordingly, in some embodiments, each object configuration may define an object type and an object kind for each data object. Rules may then be configured for actions based on the data object and the associated object kind and object type. The actions may include commands or operations to effect a particular data object or set of data objects, either by identifying the data object(s) directly, or identifying the type and/or kind or any combination thereof.

In some embodiments, upon loading the rules configuration for the operation of the key:value entry 105, the rules engine 130 may implement a rules processor 136 to execute actions for the data objects according to the rules configuration. As a result, in some embodiments, upon identifying the rules configuration, the rules processor 136 may intake the actions recognized by the DSL that are commanded by the event_N 104 according to the key:value entries 105 associated with the event_N 104. For example, the key:value entries 105 may include a key specifying a type of action in the DSL with a value representing a variable associated with the action, such as, e.g., a Boolean, integer, amount, basis point, big decimal day of the month, currency, local date, local time, natural amount, period, string, zone identifier, or other variable set according to the event_N 105.

In some embodiments, the rules processor 136 may identify the action according to the DSL and trigger rules of the rules configuration associated with the action according to the variable of the action. In some embodiments, the action may target a state of one or more data objects for modification according to a value of the variable. In some embodiments, the rules processor 136 may determine the alteration to the state of the data object and submit the altered state to the ledger 120 to record the data object state.

Moreover, in some embodiments, the DSL may enable configurations where a change to a state of a data object may trigger additional actions relative to the state of additional data objects (e.g., compound configurations). The compound configurations may include, e.g., allocating the value of the variable across multiple data objects to effect a value of the state of each of the multiple data objects, combining or rolling-up a value of the state of multiple data objects into a rollup data object, transferring the value of the variable or portion thereof between two predefined data objects, among other actions and reactive actions to state changes of various data objects. In some embodiments, the rules configuration may define what each action and reactive action is in relation to the data objects of the configuration and/or the object type and object kind of each data object.

In some embodiments, each change in the state 106 of a data object may be submitted to the ledger 120 for recordation as a key-value pair. In some embodiments, the key may identify the data object while the value may represent the updated state 106 of the data object. In some embodiments, to facilitate less storage usage, rather than updating the value of the state in each state entry, the ledger 120 may instead record in each state entry the change in the state of each data object effected by the rules processor 136. As a result, fewer key-value pairs may be used to update the state of the data objects, while the current state may be tracked elsewhere as a running total of the changes in state of the state entries, e.g., by the rules engine 130 or in any other suitable state record.

In some embodiments, the ledger 120 may append the states 106 of each data object to the key:value entry 105 to form a state entry. Each state entry may be added to the index 122 to log the event_N 104 and the state 106 of each data object to form a chain of states according to the index 122 (e.g., using a count technique). In some embodiments, each state entry may also include a configuration identifier associated with the rules configuration triggered by the event_N 104 to identify the rules configuration that caused the state 106 of each data object. As a result, retroactive processing may be performed where an event_N 104 is a backdated operation to affect states prior to a current state entry in the ledger 120.

In some embodiments, the index 122 may be indexed by a count system (e.g., sequential integers). Accordingly, in some embodiments, the count system may facilitate retroactive processing where the later-in-sequence received event_N 104 may be reflected by the index number of the state entry, while still allowing for retroactive processing of the operation associated with the event_N 104. In such a case, time may be tracked according to a date attribute reflected in the state entry as a key-value pair, where the key indicates a date and/or time data attribute and the value represented the date and/or time of the event_N 104. For example, in some embodiments, a time-keeping component 134 may be employed to identify or otherwise determine a date and/or time data attribute for the event_N 104. In some embodiments, the time-keeping component 134 may include, e.g., a calendar function, a clock function, a counter, or other suitable mechanism for determining a date and/or time. The time-keeping component 134 may append the date and/or time attribute to the event_N 104. In some embodiments, the event_N 104, however, may be received including a date and/or time attribute. In some embodiments, the date and/or time attribute may be omitted.

Figure 3:
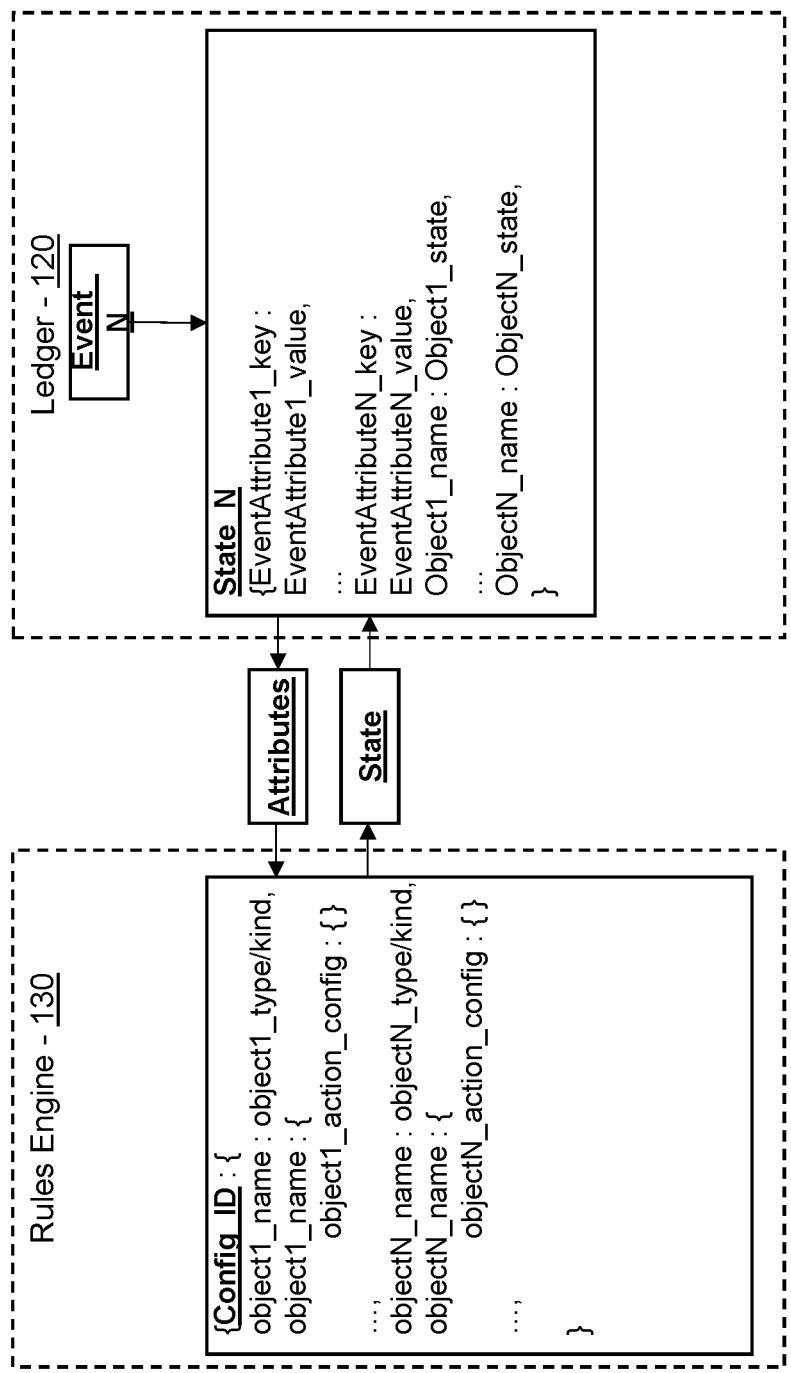

FIG. 3 depicts another block diagram illustrating an illustrative state tracking methodology with the embodiments the event processing DSL in accordance with one or more embodiments of the present disclosure.

In some embodiments, the event_N may be entered into the ledger 120 and a state entry (state N) created. In some embodiments, the state N may include event attributes in a key-value format. Accordingly, each event attribute (e.g., EventAttribute1_key: EventAttribute1_value, . . . EventAttributeN_key: EventAttributeN_value) may declare an event attribute type according to the key and the event attribute value according to the event_N.

In some embodiments, the ledger 120 may interact with the rules engine 130 to process the event attributes and determine changes in the states of data objects (Object1_name: Object1_state through ObjectN_name: ObjectN_state). To do so, the rules engine 130 may apply a rules configuration according to the event attributes. The rules configuration may have an identifier (Config_ID) that identifies the configuration for associating the rules configuration with events of a particular type, of a particular operation, of a particular entity, or by any other categorization or any combination thereof.

In some embodiments, the rules engine 130 provides the ability to define and configure a rules configuration (sometimes referred to as a product) via a domain specific language (DSL). The DSL has a definitive set of configuration elements. In some embodiments, the rules engine 130 stores attribute and states (i.e. data) as key-value pairs and the configuration elements define the key and value type for each state. At the most basic level, instruments can define simple key-value pairs (simple config) and financial "data objects" (data object config). A simple config will result in an attribute state because it does not keep track of instrument data subject to money movements.

In some embodiments, building on top of this, rules configurations can define compound configuration elements such as double entries to data objects (double entry config). In some embodiments, the rules engine 130 also can define reactive configuration elements such as the allocation of values from one data object to multiple data objects (allocation config) and rollup balances of data objects (rollup config). These data object and compound configuration elements lead to states by creating and storing traditional ledger information in the ledger 120.

In some embodiments, the rules configuration may be implemented by the rules engine 130 to cause the rules engine 130 to instruct the ledger 120 on how to execute the logic of the rules configuration. The rules configuration may include a set of configurations that dictate how commands are handled by the rules engine 130 and entered into the ledger 120. In this context, a command may include one or more actions to be performed by the rules engine 130 given a specific rules configuration. For example, a command may include an event record, such as a transaction (e.g., payments, loan extensions fee waivers, or other financial operations or any combination thereof) or other electronic activity/event (e.g., media streaming request, document changes, file uploads/downloads, or other event operations or any combination thereof), that triggers a rules configuration. In some embodiments, a provision command or commands may include a specific rules configuration along with initial data, such as, e.g., data object initial states, value limits, enumerated values (enums), data types, variable types, etc.

In some embodiments, the rules configuration may be persisted for this contract, and the rules engine 130 may refer to the rules configuration to understand how to process the initial data. For all other commands, the rules engine 130 may process the command in the same way as a provision command triggering configuration provisioning, but instead of being given the rules configuration, it is retrieved from a database (e.g., data storage 138).

In some embodiments, the rules configuration may include multiple configuration elements, such as, e.g., a basic configuration element, compound configuration elements, special configuration elements, among other elements or any combination thereof. In some embodiments, a basic or simple configuration element may include the smallest building block of a rules configuration. For example, the ledger 120 may use simple key-value pairs for a contract which is declared by a simple config. A simple transaction will simply set the value or override the existing value if it already exists. The supported values are listed in Table 1 below.

TABLE 1

| Simple Configuration Types Simple Config Types |
|---|
| Amount |
| Basis Point |
| BigDecimal |
| DayOfMonth |
| Boolean |
| Currency |
| Int |
| LocalDate |
| LocalTime |
| NaturalAmount |
| Period |
| String |
| ZoneId |

For example, for financial account via the ledger 120, flagging a contract as "delinquent" may be one transaction within a command defined by a specific rules configuration. the ledger understands "delinquent" to be a specific simple Boolean config based on the instrument and will set the delinquent flag with "true", as exemplified below:

{"delinquent": "Boolean"}

In some embodiments, enums can also be defined with the simple configs in order to constrain permissible values, with the exception of Boolean. For example, a day of the week attribute can be constrained to specific values for days of the week, as exemplified below:

```
{"dayOfWeek": {
    "String": [
        "Monday",
        "Tuesday",
        "Wednesday",
        "Thursday",
        "Friday"
    ]
} }.
```

In some embodiments, the rules configuration may also include configuration elements to configure data objects. In some embodiments, a data object may include a container that holds the value of the last event and/or an aggregate of values from past events. In some embodiments, a data object configuration establishes the context of a data object, defining its type and kind. From a processing perspective, data object type may ultimately determine whether a newly created data object is a source or target data object. In some embodiments, a data object may be a categorization of data objects, however more detailed configurations for the properties of a data object may also be included. In some embodiments, the ledger 120 may record overridden or appended values to the data object according to the event attributes and the data object configurations. Example data object types are illustrated in Table 2 below for an example embodiment of a financial ledger:

TABLE 2

Example financial data object types

| Data object Type | |
| --- | --- |
| Asset | Debit |
| Liability | Credit |
| Income | Credit |
| Expense | Debit |
| ContraAsset | Credit |
| ContraLiability | Debit |
| ContraIncome | Debit |
| ContraExpense | Credit |

In some embodiments, the data objects may include a type and a kind to define categories for which to configure rules. In some embodiments, in the example of financial ledgering, the data objects may include financial data objects (e.g., buckets or containers) with a type as shown in Table 2 and a kind including whether the financial data object is for a customer or for a company, as illustrated in Table 3 below:

TABLE 3

Example financial data object types and kinds

| | | Kind | |
| --- | --- | --- | --- |
| | | Customer | Company |
| Type | Asset | x | x |
| | Liability | x | x |
| | Income | | x |
| | Expense | | x |
| | ContraAsset | x | x |
| | ContraLiability | x | x |
| | ContraIncome | x | x |

For example, there may be a data object "principal-paid" for a loan product that is of data object type Asset and data object kind Customer, as exemplified by the key-value pair below:

{"principal-paid": "Customer-Asset"}

When someone makes a payment event, the ledger 120 records the payment amount applied and the resulting balance for the "principal-paid" data object.

In some embodiments, actions performed according to basic configuration elements can be combined to form compound configuration elements, such as, e.g., double entry actions, reactive actions (e.g., rollup actions and/or data objects and allocation actions and/or data objects), among other compound configurations or any combination thereof.

In some embodiments, an example of compound configuration element is a double entry action. In some embodiments, a double entry is a relationship between two data objects such that an action that effects one of the two data objects has an inverse effect on the other of the two data objects. For example, in a transaction, one of the two data objects may be debited and the other may be credited with the same value. In some embodiments, a double entry configuration specifies which data objects the ledger 120 are effected, e.g., which is debited and which is credited, when an action is applied.

For example, the ledger 120 may interpret a "payment" transaction to be a specific type of double entry configuration according to the rules engine 130, which is defined by the rules configuration to debit the ach-in data object and credit the unallocated-payment data object, as exemplified below:

```
{"payment": {
    "DoubleEntry": {
        "dr": "ach-in",
        "cr": "unallocated-payment"
    }
} }.
```

From here, the ledger 120 may find the corresponding data objects in the database and append the value.

In some embodiments, compound configuration elements may include reactive actions. In some embodiments, a reactive action configuration element defines actions that automatically take place as a result of specific data object changes. Based on an input, e.g., an action commanded by an event attribute or by a change in state to a particular data object, the rules engine 130 may utilize the reactive action configuration element to determine which reactive actions should be applied to process the command.

In some embodiments, an example of a reactive configuration element may include rollup data objects. In some embodiments, a rollup is an aggregation of multiple data objects and other rollups into rollup data object. The rollup configuration may specify which data objects and rollups are to be combined. When a change is made to one or more of the constituents of the rollup defined in the rollup configuration, an aggregation action is triggered that aggregates the values of the constituents and updates the state of the rollup with the aggregate. In some embodiments, rollups keep track of these aggregate values or states, but the rollups themselves may not be directly modified, only the underlying data objects.

For example, in the financial ledgering example, a rollup config, "principal", can consist of two data objects, "principal-paid" and "principal-due". A command, such as a payment, may come in and change the value of the "principal-due" data object. As a result, the "principal" rollup is triggered, combining the balances of the "principal-paid" and "principal-due" data objects, setting a new "principal" value.

```
{"principal": {
    "Rollup": [
        "principal-due",
        "principal-paid"
    ]
} }
```

In some embodiments, an example of a reactive configuration element may include allocation actions. In some embodiments, an allocation action configuration defines whether values move from one data object to multiple data objects. The allocation configuration element defines a source, a list of targets, and the destination for remaining unallocated values.

In some embodiments, a source may define a data object that holds the value to allocate across the targets. A change to this source triggers the allocation action.

In some embodiments, a target may define where the value is to be allocated. Each target may, for example, be a double entry where one entry is the source and the second entry is the data object which the value is to be allocated.

In some embodiments, an allocation configuration element may include a maximum allocation limit for each target. The minimum of the remaining source value and the target's maximum allocation value is allocated to the target. In some embodiments, the limit can be configured with a data object or a rollup. In some embodiments, the value of the limit may be used as the maximum allocation limit.

In some embodiments, a destination for remaining unallocated funds may be defined in the allocation configuration. In some embodiments, the destination defines where excess value is to be allocated, for example where the maximum allocation limit for the targets are exceeded. In some embodiments, the destination may include a double entry that is configured in the same fashion as a target.

In some embodiments, when a change is made to the source defined in the allocation configuration, the allocation action is triggered, splitting the source's value across the targets, given their limits, and destination for remaining unallocated value above the limits.

An example of a rules configuration with double entry configurations in the example of financial ledger is provided below:

```
{
    "ach-in": "Company-Asset",
    "unallocated-payment": "Customer-Liability",
    "principal": "Customer-Asset",
    "interest": "Customer-Asset",
    "overpayment": "Customer-Liability",
    "payment": {
        "DoubleEntry": {
            "dr": "ach-in",
            "cr": "unallocated-payment"
        }
    },
    "principal-payment": {
        "DoubleEntry":
            "dr": "unallocated-payment",
            "cr": "principal"
        }
    },
    "interest-payment": {
        "DoubleEntry":
            "dr": "unallocated-payment",
            "cr": "interest"
        }
    },
    "overpayment": {
        "DoubleEntry": {
            "dr": "unallocated-payment",
            "cr": "overallocated"
        }
    }
}.
```

The following would be an example allocation configuration for the financial ledgering example:

```
{"payment-allocation": {
    "Allocation" : {
        "source": "unallocated-payment",
        "targets": [
            {
                "limit": "principal",
                "target": "principal-payment"
            },
            {
                "limit": "interest",
                "target": "interest-payment"
            } ],
        "unallocated": "overpayment"
    }
} }.
```

In the above example, when a command, such as a payment, changes the value of the "unallocated-payment" data object, the "payment-allocation" allocation will be triggered, splitting the funds across the targets. The "principal" data object may be allocated to first via the "principal-payment" double entry. The "interest" data object may be allocated to next via the "interest-payment" double entry. If this payment happens to be an overpayment, the excess funds may be added to the "overallocated" data object via double entry "overpayment".

In some embodiments, the rules configuration may include additional, e.g., "special", configurations. One such example is a linked configuration that triggers a second rules configuration. The linked configuration defines a linkage service and the second configuration for applying the second configuration.

In some embodiments, the linkage service allows commands on a "primary" contract to impact one or more "linked" contracts. From the ledger 120 perspective, where the rules configuration contains a linked configuration element signifies that the linkage service is to be used, as exemplified below:

{"dealerContract": "LinkedConfiguration"}.

In some embodiments, an example of a rules configuration including basic and compound configuration elements is provided below for the example of the financial ledger:

```
{"config_ID": {
    "fields": {
        "interestRate": "BigDecimal",
        "dayOfWeek": {
            "String": [
                "Monday",
                "Tuesday",
                "Wednesday",
                "Thursday",
                "Friday"
            ]
        },
        "gracePeriod": {
            "Int": [1, 2, 3]
        },
    "ach-in": "Company-Asset",
    "unallocated-payment":    "Customer-Liability",
    "overallocated": "Customer-Liability",
    "principal-due": "Customer-Asset",
    "principal": {
    "principal-paid": "Customer-ContraAsset",
        "Rollup": [
            "principal-due",
            "principal-paid"
        ]
    },
    "interest-due": "Customer-Asset",
    "interest-paid": "Customer-ContraAsset",
    "interest": {
        "Rollup": [
            "interest-due",
            "interest-paid"
        ]
    },
```

-continued

```
"payment": {
    "DoubleEntry": {
        "dr": "ach-in",
        "cr": "unallocated-payment"
    }
},
"principal-payment": {
    "DoubleEntry": {
        "dr": "unallocated-payment",
        "cr": "principal-paid"
    }
},
"interest-payment": {
    "DoubleEntry": {
        "dr": "unallocated-payment",
        "cr": "interest-paid"
    }
},
"overpayment": {
    "DoubleEntry": {
        "dr": "unallocated-payment",
        "cr": "overallocated"
    }
},
"payment-allocation":
    "Allocation" : {
        "source": "unallocated-payment",
        "targets": [
            {
                "limit": "principal",
                "target": "principal-payment"
            },
            {
                "limit": "interest",
                "target": "interest-payment"
            } ],
        "unallocated": "overpayment"
    }
},
"dealer-contract": "LinkedConfiguration"
}
}}.
```

In some embodiments, the rules engine 130 may process the event_N, including the attributes thereof, according to the configuration elements defined therein. Based on the processing, the states of data objects are updated and appended to the ledger 120 to record the results of the event_N.

Figure 4:
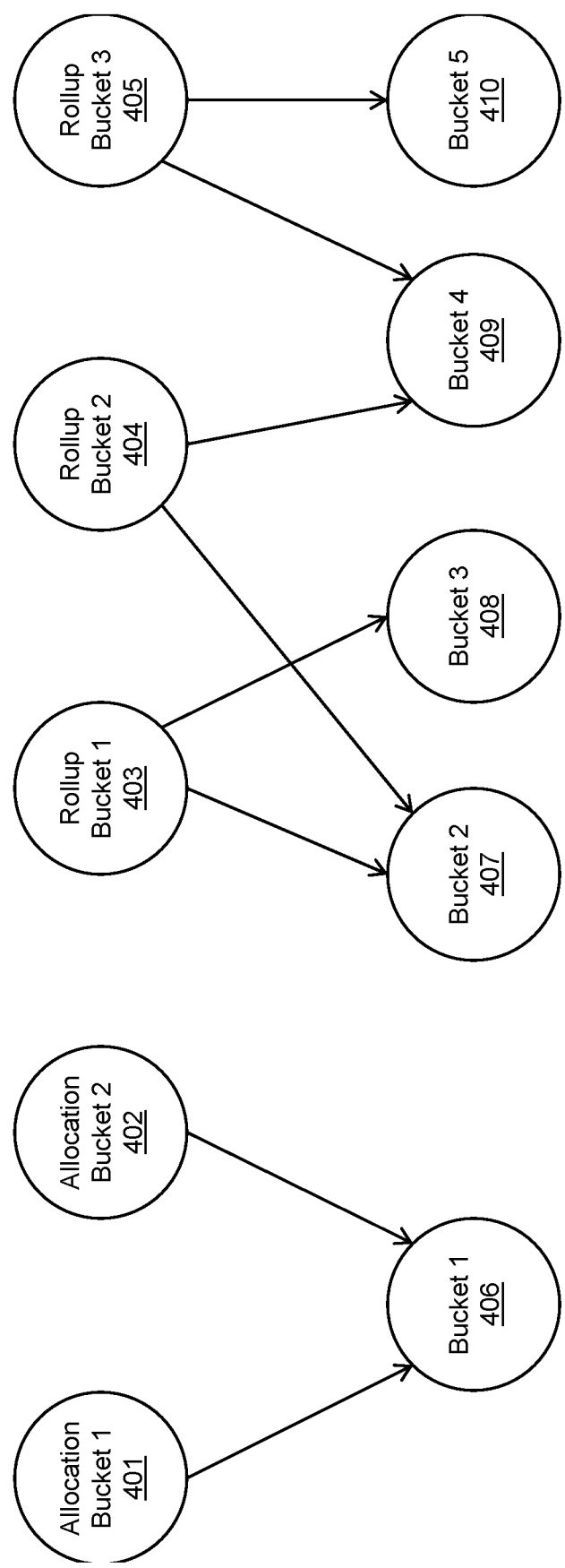

FIG. 4 depicts another diagram illustrating an illustrative dependency graph for event processing using the event processing DSL in accordance with one or more embodiments of the present disclosure.

In some embodiments, to facilitate the processing of compound configuration elements, the rules engine 130 may employ a dependency graph to map, e.g., rollup and allocation configurations. For example, allocation bucket 1 401 and allocation bucket 2 402 may be configured for buck 1 406. Thus, allocation bucket 1 401 and allocation bucket 2 402 have a dependency on bucket 1 406 such that changes to bucket 1 406 triggers allocations to allocation bucket 1 401 and allocation bucket 2 402 according to the allocation configuration.

Similarly, in some embodiments, a rollup bucket 1 403 may have a dependency on buckets 2 and 3 407 and 408, while rollup bucket 2 404 may be configured with dependencies on buckets 2 and 4 407 and 409 and rollup bucket 3 405 has dependencies on buckets 4 and 5 409 and 410. The dependency graph 400 of FIG. 4 may be employed to facilitate the processing of actions on each bucket 1 though 5 406 through 410 to update the states of the allocation buckets 1 and 2 401 and 402 and rollup buckets 1-3 403 through 405. As a result, the dependency graph maps a source object and a target object for each action of the at least one object type associated with each object.

Figure 5:
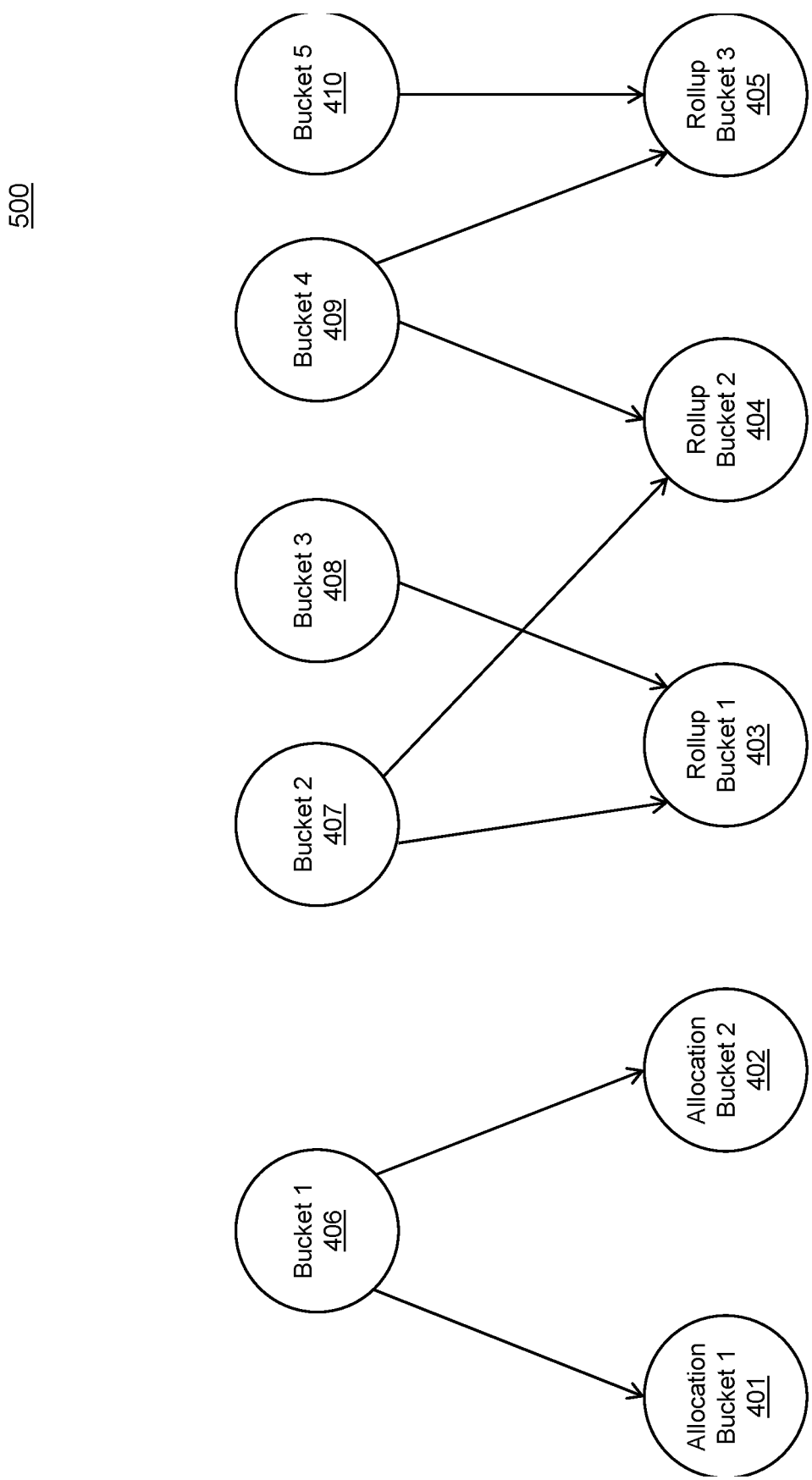

FIG. 5 depicts another diagram 500 illustrating an illustrative inverse dependency graph for event processing using the event processing DSL in accordance with one or more embodiments of the present disclosure.

In some embodiments, the rules engine 130 may invert the dependency graph of FIG. 4 to create an inverse dependency graph. The inverse dependency graph maps actions performed on a particular data object (e.g., bucket 1 through 5 406-410) to the flow of value to allocation and rollup buckets. In some embodiments, the inverse dependency graph is used to determine which reactive actions should be applied whenever a command is processed.

Figure 6:
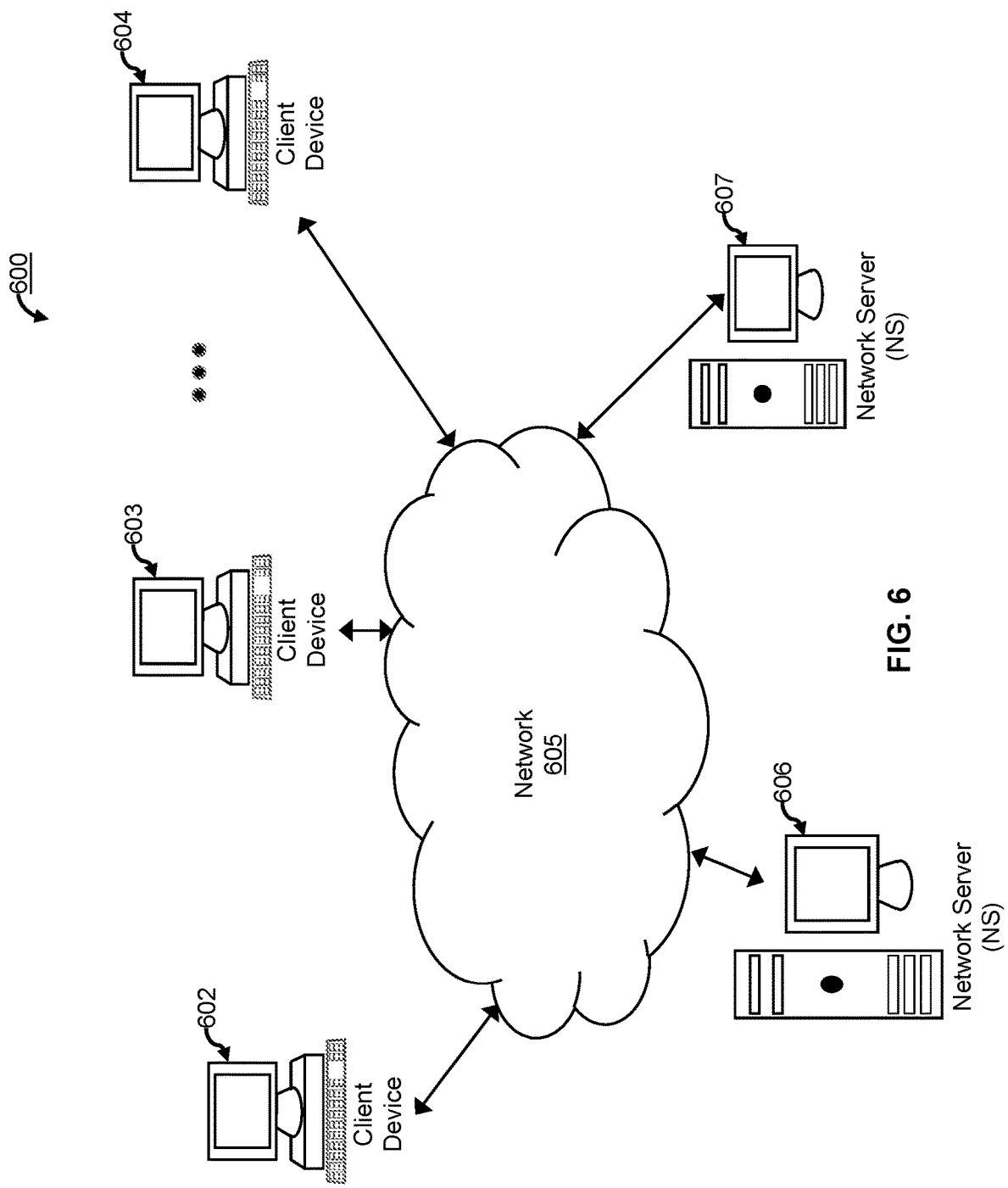

FIG. 6 depicts a block diagram of an exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 600 may be configured to manage a large number of members and concurrent transactions, as detailed herein. In some embodiments, the exemplary computer-based system and platform 600 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 6, member computing device 602, member computing device 603 through member computing device 604 (e.g., clients) of the exemplary computer-based system and platform 600 may include virtually any computing device capable of receiving and sending a message over a network (e.g., cloud network), such as network 605, to and from another computing device, such as servers 606 and 607, each other, and the like. In some embodiments, the member devices 602-604 may be personal computers, multiprocessor systems, microprocessor-based or programmable consumer electronics, network PCs, and the like. In some embodiments, one or more member devices within member devices 602-604 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 602-604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 602-604 may include may run one or more applications, such as Internet browsers, mobile applications, voice calls, video games, videoconferencing, and email, among others. In some embodiments, one or more member devices within member devices 602-604 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-604 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 602-604 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 605 may also include mass storage, such as network attached storage (NAS), a storage area network (SAN), a content delivery network (CDN) or other forms of computer or machine readable media.

In some embodiments, the exemplary server 606 or the exemplary server 607 may be a web server (or a series of servers) running a network operating system, examples of which may include but are not limited to Apache on Linux or Microsoft IIS (Internet Information Services). In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, etc. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 601-604.

In some embodiments and, optionally, in combination of any embodiment described above or below, for example, one or more exemplary computing member devices 602-604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 7:
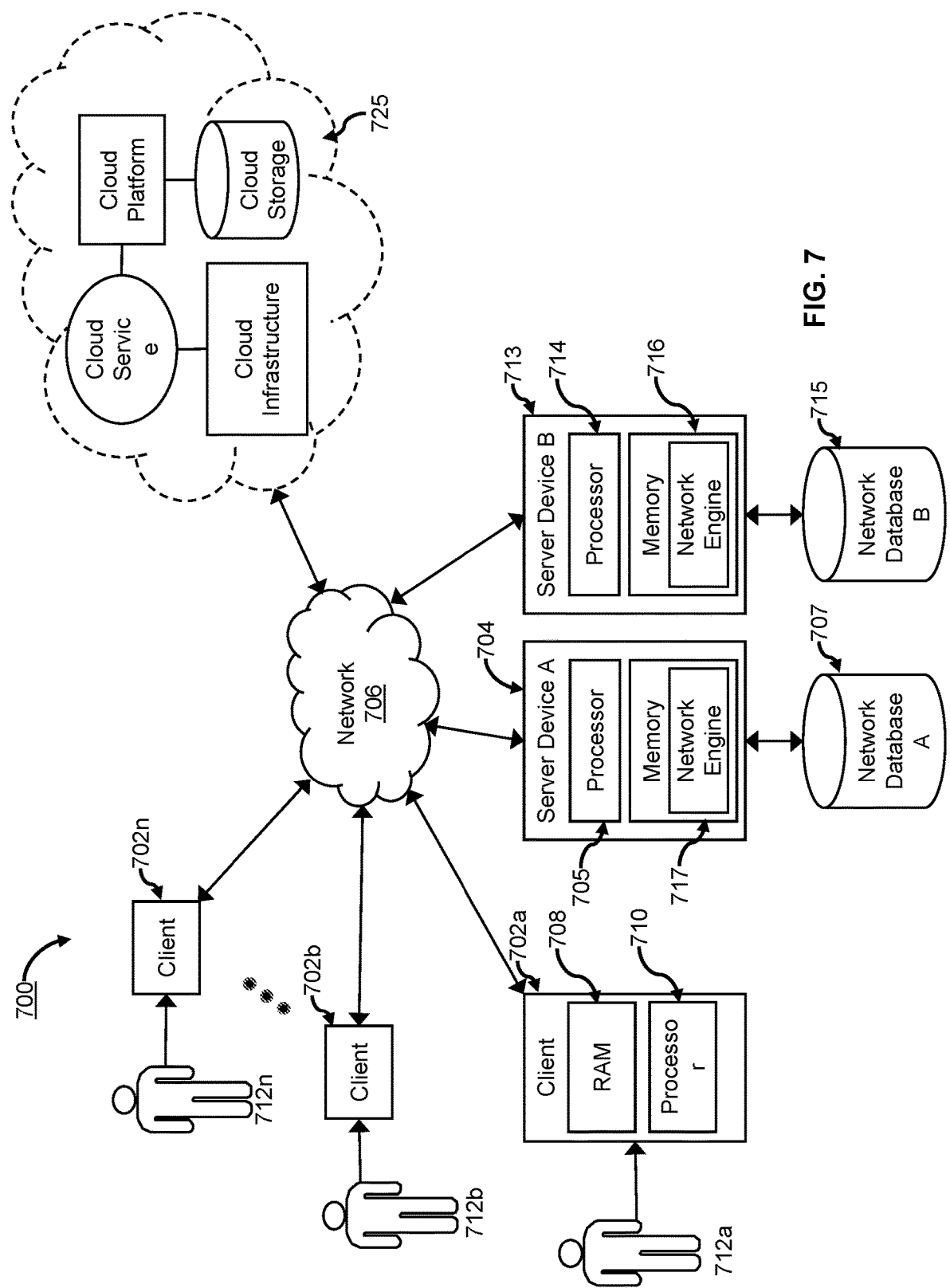

FIG. 7 depicts a block diagram of another exemplary computer-based system and platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 702a, member computing device 702b through member computing device 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of member computing device 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 702a through 702n may also comprise a number of external or internal devices such as a mouse, a CD-ROM, DVD, a physical or virtual keyboard, a display, or other input or output devices. In some embodiments, examples of member computing devices 702a through 702n (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, member computing devices 702a through 702n may be specifically programmed with one or more application programs in accordance with one or more principles/methodologies detailed herein. In some embodiments, member computing devices 702a through 702n may operate on any operating system capable of supporting a browser or browser-enabled application, such as Microsoft™ Windows™, and/or Linux. In some embodiments, member computing devices 702a through 702n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a through 702n, user 712a, user 712b through user 712n, may communicate over the exemplary network 706 with each other and/or with other systems and/or devices coupled to the network 706. As shown in FIG. 7, exemplary server devices 704 and 713 may include processor 705 and processor 714, respectively, as well as memory 717 and memory 716, respectively. In some embodiments, the server devices 704 and 713 may be also coupled to the network 706. In some embodiments, one or more member computing devices 702a through 702n may be mobile clients.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
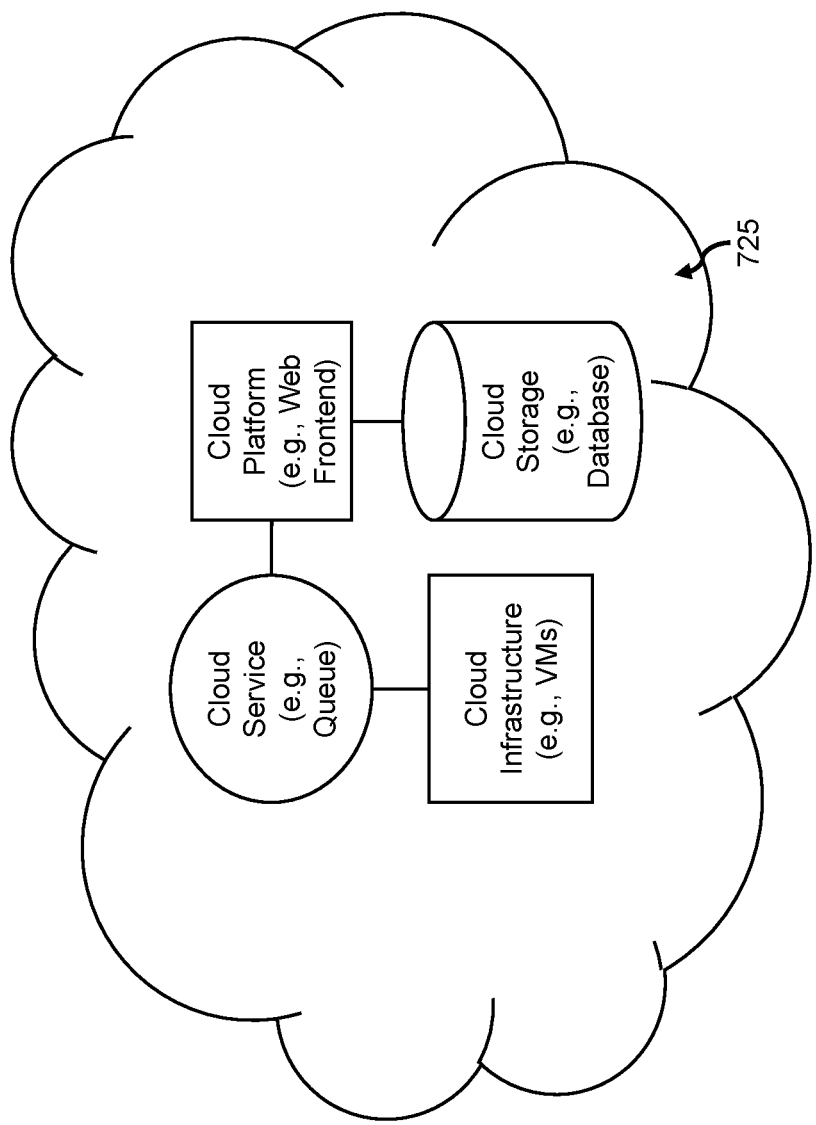
Figure 9:
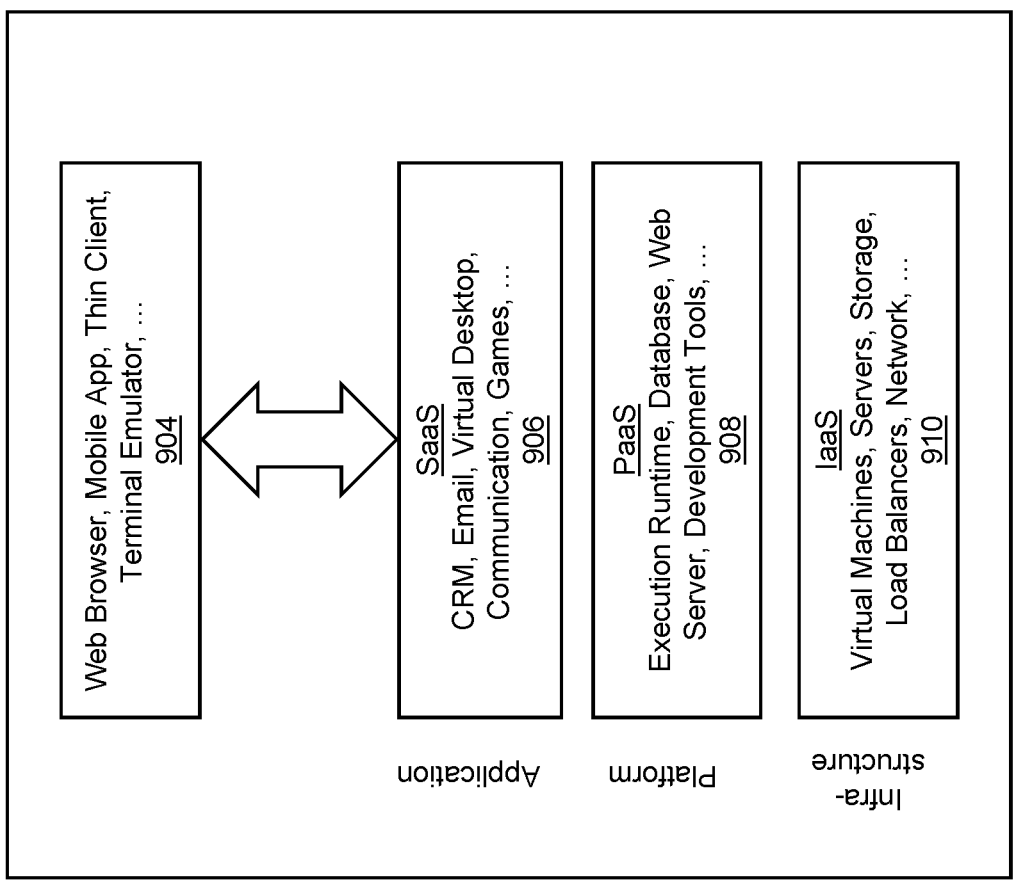

In some embodiments, the exemplary inventive computer-based systems/platforms, the exemplary inventive computer-based devices, and/or the exemplary inventive computer-based components of the present disclosure may be specifically configured to operate in a cloud computing/architecture 725 such as, but not limiting to: infrastructure a service (IaaS) 910, platform as a service (PaaS) 908, and/or software as a service (SaaS) 906 using a web browser, mobile app, thin client, terminal emulator or other endpoint 904. FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, the ledger 120 and rules engine 130 of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, the event processing system 100 may be configured to output to one or more computing devices, distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, the services 101 and/or the event processing system 100 and/or the object management service 140 of the present disclosure may include one or more cloud platforms, where "cloud," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the events and the ledger 120 may be configured to utilize one or more of encryption techniques (e.g., private/public key pair, Triple Data Encryption Standard (3DES), block cipher algorithms (e.g., IDEA, RC5, RC5, CAST and Skipjack), cryptographic hash algorithms (e.g., MD5, RIPEMD-160, RTRO, SHA-1, SHA-2, Tiger (TTH),WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

1. A method comprising:
   receiving, by at least one processor, an event including a reference to an instrument;
      wherein the event comprises at least one key-value pair representing at least one data attribute defining an operation;
   accessing, by the at least one processor, an instrument configuration associated with the instrument;
      wherein the instrument configuration comprises at least one object configuration associated with at least one data object and at least one rule configuration;
      wherein the at least one object configuration comprises:
         at least one object type associated with the instrument, and
         at least one object kind associated with the instrument;
      wherein the at least one rule configuration defines at least one action to perform on the at least one data object as a result of at least one object state of the at least one data object based at least in part on the at least one object type and the at least one object kind;
   determining, by the at least one processor, at least one change to at least one object state based at least in part on the at least one data attribute;
   generating, by the at least one processor, an inverse dependency graph to map reactive actions in response to the at least one change to at least one object state based at least in part on the at least one object configuration;
   determining, by the at least one processor, at least one reactive action of the reactive actions based at least in part on the inverse dependency graph;
   determining, by the at least one processor, an update to the at least one change to the at least one object state as a result of the at least one reactive action; and
   updating, by the at least one processor, a data record of states comprising changes to the at least one data object based at least in part on the update to the at least one change to the at least one object state.

2. A system comprising:
   at least one processor configured to execute software instructions causing the at least one processor to perform steps to:
      receive an event including a reference to an instrument;
         wherein the event comprises at least one key-value pair representing at least one data attribute defining an operation;
      access an instrument configuration associated with the instrument;

wherein the instrument configuration comprises at least one object configuration associated with at least one data object and at least one rule configuration;
wherein the at least one object configuration comprises:
at least one object type associated with the instrument, and
at least one object kind associated with the instrument;
wherein the at least one rule configuration defines at least one action to perform on the at least one data object as a result of at least one object state of the at least one data object based at least in part on the at least one object type and the at least one object kind;
determine at least one change to at least one object state based at least in part on the at least one data attribute;
generate an inverse dependency graph to map reactive actions in response to the at least one change to at least one object state based at least in part on the at least one object configuration;
determine at least one reactive action of the reactive actions based at least in part on the inverse dependency graph;
determine an update to the at least one change to the at least one object state as a result of the at least one reactive action; and
update a data record of states comprising changes to the at least one data object based at least in part on the update to the at least one change to the at least one object state.

3. The methods and systems of any of clauses 1 and/or 2, further comprising generating, by the at least one processor, a dependency graph based at least in part on the at least one object configuration, wherein the dependency graph maps a source object and a target object for each action of the at least one object type associated with each object of a plurality of objects.

4. The methods and systems of any of clauses 1 and/or 2 and/or 3, further comprising generating, by the at least one processor, the inverse dependency graph by inverting the dependency graph.

5. The methods and systems of any of clauses 1 and/or 2, wherein the at least one rule configuration comprises at least one simple configuration and at least one object configuration.

6. The methods and systems of any of clauses 1 and/or 2, wherein the instrument comprises a financial product;
wherein the event comprises at least one transaction request; and
wherein the instrument configuration comprises a digitization of the financial product to enable automatic processing of the at least one transaction request relative to an account associated with the financial product.

7. The methods and systems of any of clauses 1 and/or 2, further comprising:
determining, by the at least one processor, a date and a time associated with the event; and
recording, by the at least one processor, the changes to the at least one data object by appending the changes with the date and the time to at least one set of changes associated with the at least one data object to update the at least one change to the at least one object state.

8. The methods and systems of any of clauses 1 and/or 2, wherein the at least one object state comprises at least one value representing a total amount of actions and reactive actions associated with each data object of the at least one data object.

9. The methods and systems of any of clauses 1 and/or 2, wherein the at least one data object is a plurality of data objects; and
wherein the at least one object configuration comprises at least one rollup configuration specifying a combination of a subset of the plurality of data objects.

10. The methods and systems of any of clauses 1 and/or 2, wherein the at least one data object is a plurality of data objects; and
further comprising determining, by the at least one processor, at least one allocation action to move a value from a source data object to a plurality of target data objects based at least in part on at least one allocation configuration of the at least one object configuration and the at least one action.

11. The methods and systems of clause 10, further comprising generating, by the at least one processor, a change to each target data object of the plurality of target data objects by sequentially allocating the value from the source data object to each target data object until an allocation limit is reached according to an order of the plurality of target data objects in the at least one allocation configuration.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:
receiving, by at least one processor, an event including a reference to an instrument; wherein the event comprises an operation to change at least one attribute of at least one data object associated with the instrument;
accessing, by the at least one processor, an instrument configuration associated with the instrument;
wherein the instrument configuration is implemented using a domain-specific programming language and comprises a plurality of key-value pairs defining a plurality of relationships between the at least one data object and at least one available action to perform on the at least one data object;
wherein the plurality of key-value pairs of the instrument configuration comprises:
at least one object configuration associated with the at least one data object and
at least one rule configuration;
wherein the at least one object configuration comprises:
at least one object type key paired to at least one object type value defining at least one object type of the at least one data object associated with the instrument,
wherein the at least one object type value is associated with at least one available action associated with the at least one data object, and
at least one object kind key paired to at least one object kind value defining at least one object kind that categorizes the at least one data object associated with the instrument;

wherein the at least one rule configuration defines a mapping of the at least one available action to the at least one data object based at least in part on:
the at least one object type and
the at least one object kind;
executing, by the at least one processor, the instrument configuration in the domain-specific programming language to cause at least one action to be performed on the at least one data object based at least in part on the at least one available action and the at least one data object to cause at least one change to at least one object state based at least in part on the at least one attribute;
generating, by the at least one processor, an inverse dependency graph to map reactive actions in response to the at least one change to at least one object state based at least in part on the at least one object configuration;
determining, by the at least one processor, at least one reactive action of the reactive actions based at least in part on the inverse dependency graph;
determining, by the at least one processor, at least one additional change to the at least one object state resulting from the at least one reactive action; and
updating, by the at least one processor, a data record of states comprising changes to the at least one data object based at least in part on the at least one additional change to the at least one object state.

2. The method of claim 1, further comprising generating, by the at least one processor, a dependency graph based at least in part on the at least one object configuration, wherein the dependency graph maps a source object and a target object for each action of the at least one object type associated with each object of a plurality of objects.

3. The method of claim 2, further comprising generating, by the at least one processor, the inverse dependency graph by inverting the dependency graph.

4. The method of claim 1, wherein the at least one rule configuration comprises at least one simple configuration and at least one object configuration.

5. The method of claim 1, wherein the instrument comprises a financial product;
wherein the event comprises at least one transaction request; and
wherein the instrument configuration comprises a digitization of the financial product to enable automatic processing of the at least one transaction request relative to an account associated with the financial product.

6. The method of claim 1, further comprising:
determining, by the at least one processor, a date and a time associated with the event; and
recording, by the at least one processor, the changes to the at least one data object by appending the changes with the date and the time to at least one set of changes associated with the at least one data object to update the at least one change to the at least one object state.

7. The method of claim 1, wherein the at least one object state comprises at least one value representing a total amount of actions and reactive actions associated with each data object of the at least one data object.

8. The method of claim 1, wherein the at least one data object is a plurality of data objects; and
wherein the at least one object configuration comprises at least one rollup configuration specifying a combination of a subset of the plurality of data objects.

9. The method of claim 1, wherein the at least one data object is a plurality of data objects; and further comprising determining, by the at least one processor, at least one allocation action to move a value from a source data object to a plurality of target data objects based at least in part on at least one allocation configuration of the at least one object configuration and the at least one action.

10. The method of claim 9, further comprising generating, by the at least one processor, a change to each target data object of the plurality of target data objects by sequentially allocating the value from the source data object to each target data object until an allocation limit is reached according to an order of the plurality of target data objects in the at least one allocation configuration.

11. A system comprising:
at least one processor configured to execute software instructions causing the at least one processor to perform steps to:
receive an event including a reference to an instrument;
wherein the event comprises an operation to change at least one attribute of at least one data object associated with the instrument;
access an instrument configuration associated with the instrument;
wherein the instrument configuration is implemented using a domain-specific programming language and comprises a plurality of key-value pairs defining a plurality of relationships between the at least one data object and at least one available action to perform on the at least one data object;
wherein the plurality of key-value pairs of the instrument configuration comprises:
at least one object configuration associated with the at least one data object and
at least one rule configuration;
wherein the at least one object configuration comprises:
at least one object type key paired to at least one object type value defining at least one object type of the at least one data object associated with the instrument,
wherein the at least one object type value is associated with at least one available action associated with the at least one data object, and
at least one object kind key paired to at least one object kind value defining at least one object kind that categorizes the at least one data object associated with the instrument;
wherein the at least one rule configuration defines a mapping of the at least one available action to the at least one data object based at least in part on:
the at least one object type and
the at least one object kind;
execute the instrument configuration in the domain-specific programming language to cause at least one action to be performed on the at least one data object based at least in part on the at least one available action and the at least one data object to cause at least one change to at least one object state based at least in part on the at least one attribute;
generate an inverse dependency graph to map reactive actions in response to the at least one change to at least one object state based at least in part on the at least one object configuration;
determine at least one reactive action of the reactive actions based at least in part on the inverse dependency graph;

determine at least one additional change to the at least one object state resulting from the at least one reactive action; and update a data record of states comprising changes to the at least one data object based at least in part on the at least one additional change to the at least one object state.

12. The system of claim 11, wherein the software instructions further cause the at least one processor to perform steps to generate a dependency graph based at least in part on the at least one object configuration, wherein the dependency graph maps a source object and a target object for each action of the at least one object type associated with each object of a plurality of objects.

13. The system of claim 12, wherein the software instructions further cause the at least one processor to perform steps to generate the inverse dependency graph by inverting the dependency graph.

14. The system of claim 11, wherein the at least one rule configuration comprises at least one simple configuration and at least one object configuration.

15. The system of claim 11, wherein the instrument comprises a financial product;
wherein the event comprises at least one transaction request; and
wherein the instrument configuration comprises a digitization of the financial product to enable automatic processing of the at least one transaction request relative to an account associated with the financial product.

16. The system of claim 11, wherein the software instructions further cause the at least one processor to perform steps to:
determine a date and a time associated with the event; and
record the changes to the at least one data object by appending the changes with the date and the time to at least one set of changes associated with the at least one data object to update the at least one change to the at least one object state.

17. The system of claim 11, wherein the at least one object state comprises at least one value representing a total amount of actions and reactive actions associated with each data object of the at least one data object.

18. The system of claim 11, wherein the at least one data object is a plurality of data objects; and
wherein the at least one object configuration comprises at least one rollup configuration specifying a combination of a subset of the plurality of data objects.

19. The system of claim 11, wherein the at least one data object is a plurality of data objects; and
wherein the software instructions further cause the at least one processor to perform steps to determine at least one allocation action to move a value from a source data object to a plurality of target data objects based at least in part on at least one allocation configuration of the at least one object configuration and the at least one action.

20. The system of claim 19, wherein the software instructions further cause the at least one processor to perform steps to generate a change to each target data object of the plurality of target data objects by sequentially allocating the value from the source data object to each target data object until an allocation limit is reached according to an order of the plurality of target data objects in the at least one allocation configuration.

* * * * *